United States Patent [19]
Baldwin et al.

[11] Patent Number: 5,538,231
[45] Date of Patent: Jul. 23, 1996

[54] APPARATUS FOR LOCATING A WORKPIECE ON A BURN TABLE

[75] Inventors: John B. Baldwin, Warrenville; Dave R. Draper, Montgomery, both of Ill.

[73] Assignee: Caterpillar Inc., Peoria, Ill.

[21] Appl. No.: 346,719

[22] Filed: Nov. 30, 1994

[51] Int. Cl.$^6$ ........................................ B23Q 3/00
[52] U.S. Cl. ..................... 269/304; 269/305; 269/315; 269/900
[58] Field of Search ....................... 269/303, 304, 269/305, 315, 900

[56] References Cited

U.S. PATENT DOCUMENTS

| | | |
|---|---|---|
| 2,430,613 | 11/1947 | Hodge . |
| 2,547,211 | 4/1951 | Holmes ................................. 269/305 |
| 2,888,052 | 5/1959 | Reason . |
| 3,608,886 | 9/1971 | Greene ................................. 269/305 |
| 3,948,502 | 4/1976 | Waller et al. . |
| 4,461,946 | 7/1984 | Kratschmer . |
| 4,477,064 | 10/1984 | DiGiulio ............................... 269/305 |
| 4,508,327 | 4/1985 | Ersoy . |
| 4,641,819 | 2/1987 | Poland . |
| 5,026,033 | 6/1991 | Roxy . |
| 5,129,637 | 7/1992 | Ito et al. . |

Primary Examiner—Robert C. Watson
Attorney, Agent, or Firm—Kenneth A. Rhoads

[57] ABSTRACT

An apparatus is provided for positioning a workpiece on a burn table. The apparatus has a locator assembly which is moveable between a first position at which the locator is engageable with the workpiece and a second position at which the locator assembly is spaced from the workpiece.

5 Claims, 3 Drawing Sheets

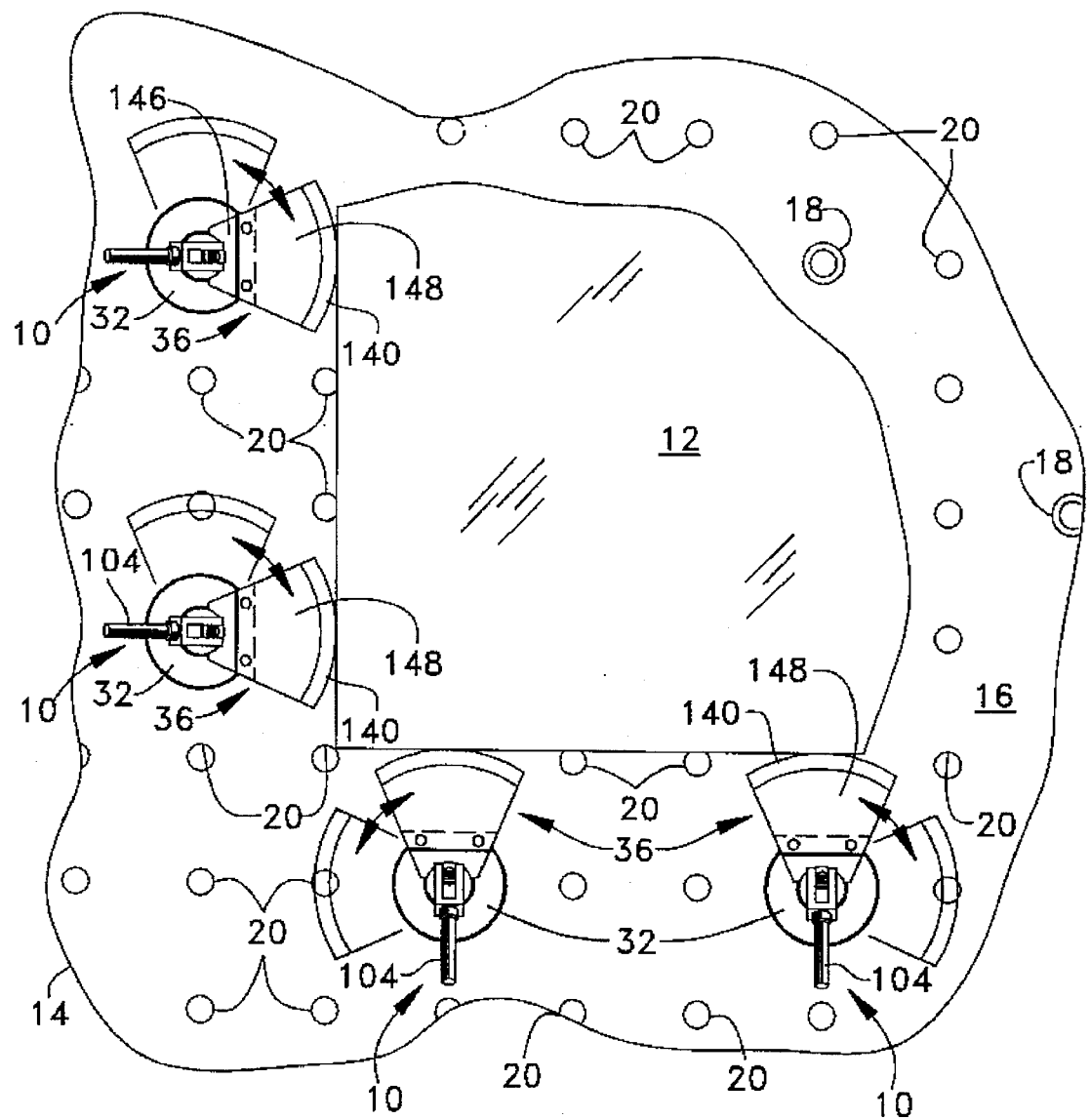
Fig_1_

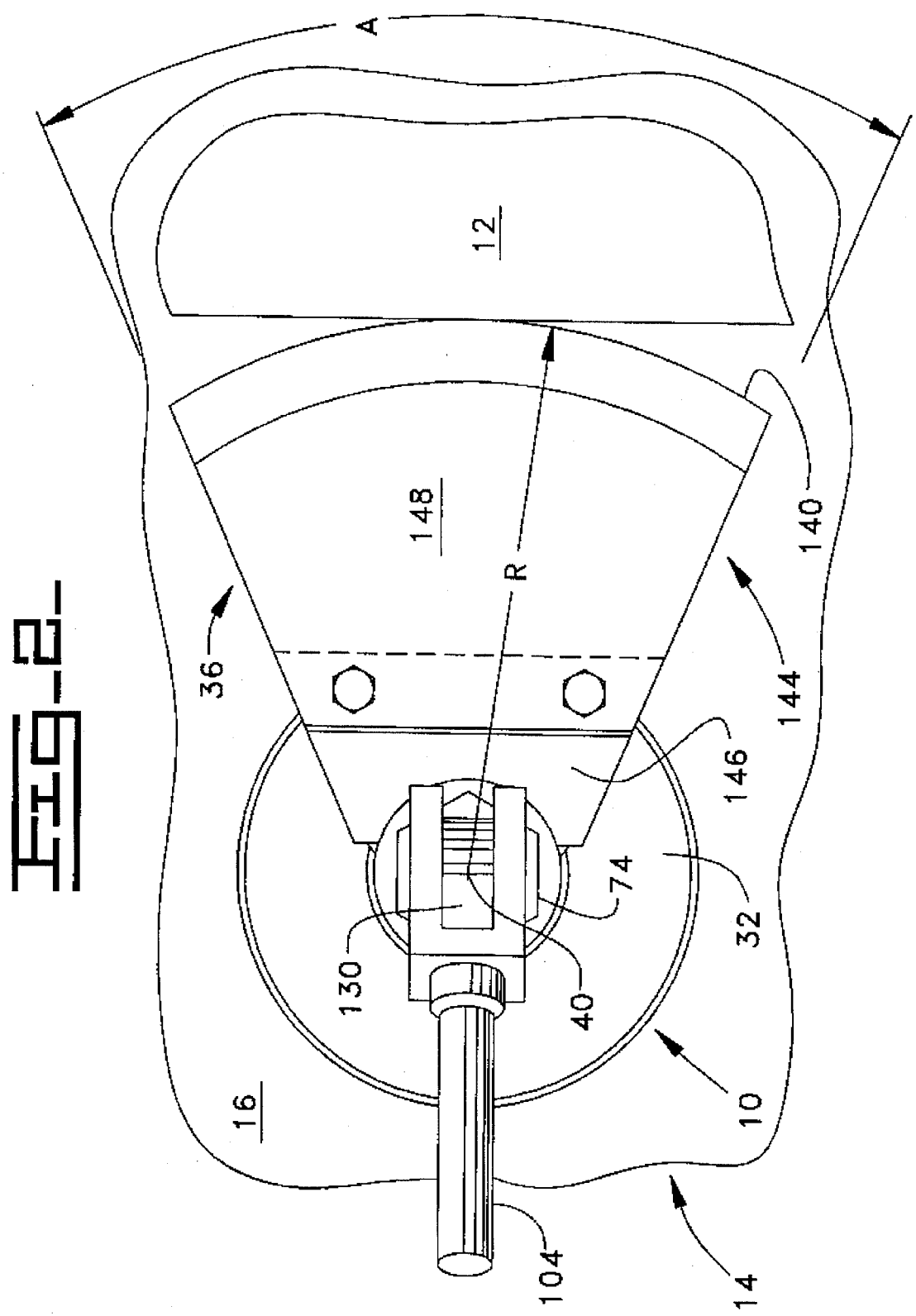

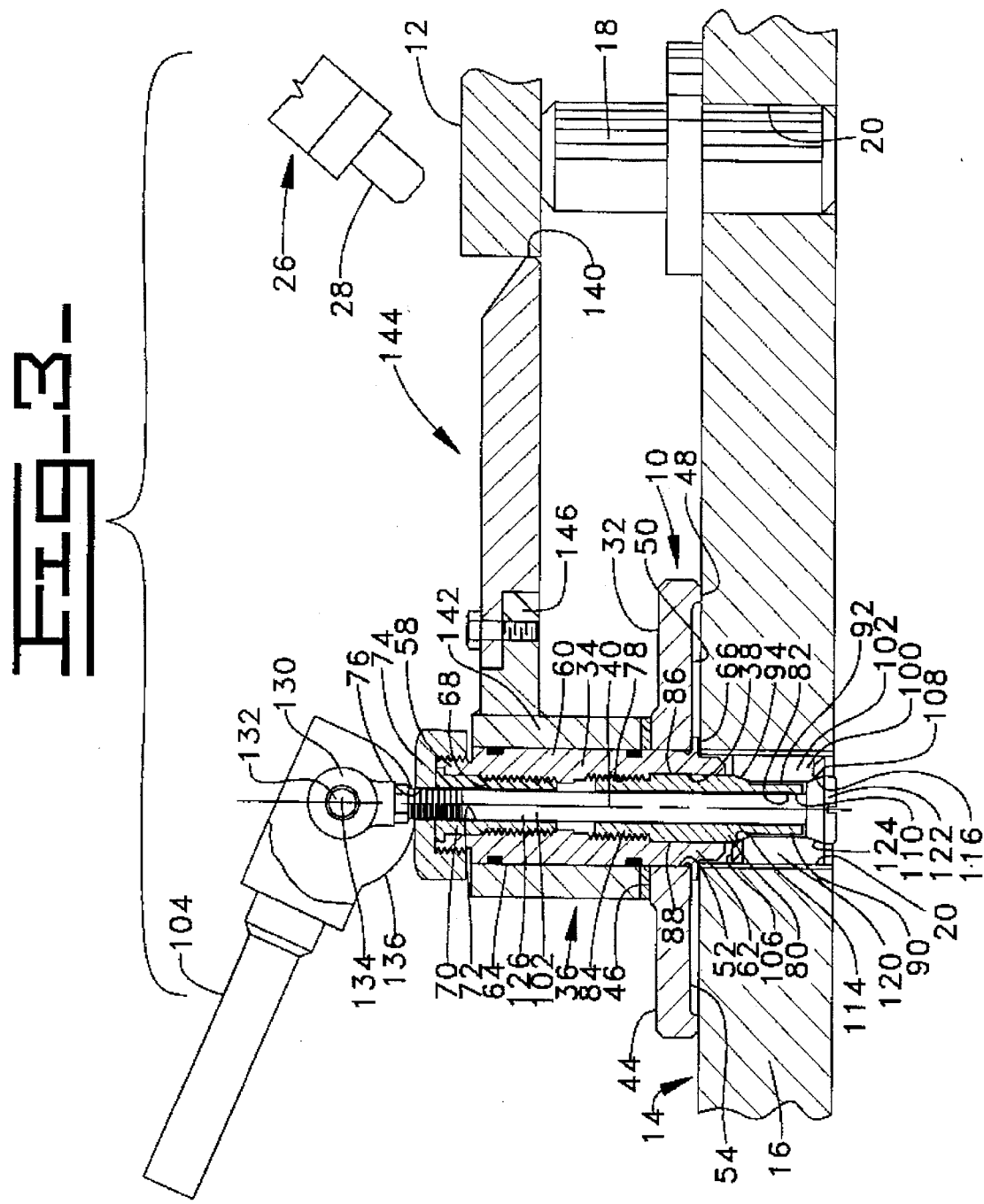

5,538,231

APPARATUS FOR LOCATING A WORKPIECE ON A BURN TABLE

TECHNICAL FIELD

The present invention relates to an apparatus for locating a workpiece on a burn table.

BACKGROUND ART

Flame cutting is utilized for cutting, piercing, scarfing, severing, and the like of selected portions of metal from steel workpieces. Conventional production flame cutting machines have one or more automatic or semiautomatic computer controlled and guided torches for preforming the operation generally on a water submerged horizontal burn table. Often these are repetitive operations, cutting the same preselected shape over and over again. The workpiece generally rests on a plurality of upstanding pedestals at water level. The workpiece is positioned on the burn table by butting one or more edges of the workpiece against a series of removable locators on the burn table. The locators are manually installed in holes in the burn table at predetermined locations relative to a preselected programmed path of the torch or torches. After the workpiece has been positioned the locators must be removed from the burn table to prevent damage to the locators from the torch during the burn operation. Time spent by the operator installing and removing the locators detracts from productive work. In addition it is possible to inadvertently install a locator at a wrong location resulting in the workpiece being positioned incorrectly on the burn table. Still further, the constant installation and removal of the locators from the burn table results in accelerated wear of the locators and burn table mating surfaces. The subject invention provides a relatively simple locating apparatus which need not be removed from the burn table, but pivoted out of the way during the burn operation and pivoted back to locate the next workpiece. With such construction there is realized a savings of equipment, labor, and natural resources.

The present invention is directed to overcome one or more of the problems as set forth above.

DISCLOSURE OF THE INVENTION

In one aspect of the invention, a burn table has a horizontal platform with a plurality of holes positioned at preselected locations therein. A tubular shaft has a lower pilot portion and an upper shaft portion. The pilot portion is adapted to receive to be received within a selected one of the holes of the platform.

A clamping device selectably clamps the shaft within the one hole. A locator assembly has a tubular sleeve. A blade assembly extending radially from the sleeve with a peripheral surface portion adapted to make locating contact with the workpiece. The locating assembly is pivotable about the shaft between a first position at which the peripherial surface is in locating contact with the workpiece and a second position at which the blade assembly is safely spaced from the workpiece.

BRIEF DESCRIPTION OF THE DRAWINGS

FIG. 1 is a diagrammatic top view of a burn table incorporating the subject invention;

FIG. 2 is a diagrammatic enlarged top view of the locating apparatus; and

FIG. 3 is a diagrammatic cross-sectional view of the locating apparatus mounted on the burn table.

BEST MODE FOR CARRYING OUT THE INVENTION

Referring to FIGS. 1, 2, and 3 a plurality of locating apparatus 10 for locating a workpiece 12 on a submerged cutting or burn table 14 is illustrated. In the description of the drawings, only one locating apparatus 10 will be described in detail with the remainder being identical. It is understood that normally, at least a pair of the locating apparatus 10 are used to locate a workpiece 12 on the burn table 14.

The burn table 14, as is well known in the art, is formed from a horizontal table or platform 16 and includes a plurality of vertical workpiece pedestals 18. The platform 16 of the burn table 14 defines a plurality of holes 20 positioned at preselected locations, each adapted to selectively receive one of the locating apparatus 10 or one of the pedestal 18. The pedestals 18 support the workpiece horizontally. The platform 16 and pedestals 18 are normally submerged in water.

As shown in FIG. 3, a conventional computer controlled flame cutting machine 26, as is well known in the art, is mounted for movement over the top of the burn table 14 and the workpiece 12. The flame cutting machine 26 includes a downwardly directed cutting torch 28. In operation, flame from the torch 28 performs a cutting operation on the workpiece 12. The pedestals 18 provide space between the back side of the workpiece 12 and the platform 16 since the flame from the cutting torch 28 must generally pass entirely through the workpiece without being deflected.

Preferably, the locating apparatus 10 includes a generally cylindrical horizontal base 32, a vertically mounted tubular shaft 34, and a locating assembly 36. The tubular shaft 34 has a shaft stepped bore 38 and an axis 40.

As best shown in FIG. 3, the base 32 has a 10 first upper base side 44 having a raised horizontal mounting surface 46, a second lower base side 48 having a recess 50, and a central opening 52. The recess 50 has a rear wall 54.

The tubular shaft 34 also has a first upper threaded shaft end portion 58, a middle shaft portion 60, a second lower pilot portion 62, and an outer shaft peripheral surface 64. An annular flange 66 extends outwardly from the peripheral surface 64 adjacent the lower pilot portion 62. The tubular shaft 34 is press fitted in the opening 52 of the base 32 with the flange 66 located within the recess 50 and against the rear wall 54.

A first threaded hole 68 is formed in the first end portion 58 of the tubular shaft 34 and extends along the axis 40. A first threaded tubular bushing 70 having a first axial bore 72 is threaded into the first threaded hole 68. A flat top cap nut 74 having a cap bore 76 is threads on the first shaft end portion 58 and over the end of the bushing 70.

A second threaded hole 78 is formed in the middle portion 60 of the tubular shaft 34 and extends along the axis 40. A second threaded tubular bushing 80 having a second axial bore 82 is threaded into the second threaded hole 76. The tubular bushing 78 defines a first threaded end 84, an intermediate portion 86 of preselected annular cross-section having a first external cylindrical surface 88, and a second end 90 of reduced annular cross-section having an second external cylindrical surface 92. A generally conical converging surface 94 connects the cylindrical surfaces 88 and 92. The conical surface 94 and the second end 90 of the bushing 78 extends beyond the end of the second end portion 62 of the tubular shaft 34.

The pilot portion 62 of the tubular shaft 34 is adapted to be received within one of the hole 20. A clamping device 100 for selectively clamping the shaft 34 within one the hole 20 is provided about the second end 90 of the tubular bushing 80. The clamping device 100 fits snugly in the hole 20 of the platform 16 and a tie bolt 102 and cam lever 104 is operable for expanding the expander member 100 laterally so as to secure the apparatus 10 in the hole in accordance to axial movement of the tie bolt 102.

The clamping device 100 has first and second expander end surfaces 106 and 108, and an expander bore 110. A pair of first and second conical expander surfaces 114, 116 extend radially inward from the first and second end surfaces 106 and 108 terminating at the expander bore 110. The expander member 100 is formed with four slits 120 (two of which is shown) alternately extend upward and downward from the end surfaces 106 and 108 so as to separate the expander member 100 into four equivalent segments alternately joined to each other at their ends. The expander bore 110 pilots on the second external cylindrical surface 92 of the bushing 80.

The tie bolt 102 has a head 122 with a conical head seat 124, and a shank 126. The first expander surface 114 is located in contact with the conical converging surface 94 of the second threaded bushing 80 and the second expander surface 116 is located in contact with the conical seat 114 of the tie bolt 102. The tie bolt 102 extends upward, as viewed in FIG. 3, through the first and second bushing bores 72 and 82 and the cap nut bore 76 where it is threadably connected to an eye bolt 130. The eye bolt 130 is in turn pivotally connected to the cam lever 104 by a pin 132 having a pin axis 134. The cam lever 104 has an outer peripheral cam surface 136 defined by a preselected curve generated about the axis 134. The cam surface 136 rides on the cap nut 74.

As best shown in FIG. 2 and 3, the locator assembly 36 has an outer cam peripheral surface 140 defined by a preselected radius "R" generated from the axis 40. The locator assembly 36 is a circular segment defined by an included angle "A" of greater than 20 degrees. The locator assembly 36 includes a tubular sleeve 142 and a blade assembly 144 extends radially from the tubular sleeve. The peripheral surface portion is adapted to make contact with the workpiece 12 and the sleeve is adapted to be pivotally mounted about the shaft between a first position at which said peripheral surface is in locating contact with the workpiece 12 and a second position at which the blade assembly is safely spaced from the workpiece. The blade assembly 144 includes a first inner portion 146 connected to the sleeve 142 and a second outer portion 148 removably connected to the first portion. The locator assembly 36 is rotatable a full 360 degrees about the axis 40.

Industrial Applicability

In operation the apparatus 10 locates the workpiece 12 on the burn table 14 at a preselected position by butting an edge of the workpiece 12 against the outer peripheral surface 140 of the locator assembly 36. Once the apparatus 10 has been installed on the burn table 14 it need not be removed prior to the burn operation and reinstalled after the burn operation to locate successive workpieces 12 of like kind, saving considerable time and expense. Prior to the burn operation the locator 36 is pivoted out of the way to prevent damage to the locator from the burn operation and simply pivoted back to locate the next workpiece 12. With the outer peripheral surface 140 generated from the axis 40 allows the workpiece 12 to be precisely located at any point on the surface. The arcuate length of the outer peripheral surface 140 is relatively long which allows considerable tolerance when repositioning the locator for the next workpiece. The locator 36 is a circular segment defined by an included angle "A" greater than 20 degrees.

The apparatus 10 is secured in a selected hole 20 by expanding the clamping device 100 in the hole 20. This is accomplished by pivoting the cam lever 104 by an operator, in a counterclockwise direction, as viewed in FIG. 3, moving tie bolt 102 axially upward compressing the clamping device 100 between the conical converging surface 94 and the conical head seat 124 expanding the clamping device in the hole 20.

Other aspects, objects, and advantages of this invention can be obtained from a study of the drawings, the disclosure, and the appended claims.

We claim:

1. Apparatus for locating a workpiece on a burn table, said burn table having a horizontal platform with a plurality of holes positioned at preselected locations therein, comprising;

a tubular shaft having a lower pilot portion and an upper shaft portion, said pilot portion being adapted to be received within a selected one of said holes of the platform;

a clamping device for selectably clamping said shaft within said one hole; and a locator assembly being positioned about said tubular shaft and having a tubular sleeve and a blade assembly extending radially from said sleeve, said blade assembly having a peripheral surface portion being generated from an axis and being defined by a preselected radius, said peripheral surface portion being adapted to make locating contact with said workpiece and said sleeve being adapted to be pivotally mounted about said shaft, said locating assembly being pivotable about said shaft between a first position at which said peripheral surface is in locating contact with said workpiece and a second position at which said blade assembly is spaced from said workpiece.

2. An apparatus, as set forth in claim 1, wherein the locator assembly has an outer peripheral surface defined by a preselected radius "R" generated from the axis.

3. An apparatus, as set forth in claim 2, wherein the locator assembly is a circular segment defined by an included angle "A" greater than 20 degrees.

4. An apparatus, as set forth in claim 1, wherein the blade member includes a first inner portion connected to said sleeve and a second outer portion removably connected to said first portion.

5. An apparatus, as set forth in claim 1, wherein the locator assembly being rotatably a full 360 degrees about the axis.

* * * * *